(12) United States Patent
Davis et al.

(10) Patent No.: US 10,026,942 B2
(45) Date of Patent: Jul. 17, 2018

(54) BUS BAR ASSEMBLY INCLUDING INTEGRATED BUS BAR SUPPORT

(71) Applicant: A123 Systems, LLC, Waltham, MA (US)

(72) Inventors: Jason R. Davis, Commerce Township, MI (US); Robert Dickie, Canton, MI (US); Kevin Martus, Howell, MI (US); Michael Shenberger, Walled Lake, MI (US); David Allen, Wixom, MI (US); Michael Wiener, Canton, MI (US)

(73) Assignee: A123 Systems LLC, Waltham, MA (US)

( * ) Notice: Subject to any disclaimer, the term of this patent is extended or adjusted under 35 U.S.C. 154(b) by 266 days.

(21) Appl. No.: 14/414,086

(22) PCT Filed: Jul. 10, 2013

(86) PCT No.: PCT/US2013/049966
§ 371 (c)(1),
(2) Date: Jan. 9, 2015

(87) PCT Pub. No.: WO2014/011801
PCT Pub. Date: Jan. 16, 2014

(65) Prior Publication Data
US 2015/0207127 A1    Jul. 23, 2015

Related U.S. Application Data

(60) Provisional application No. 61/670,017, filed on Jul. 10, 2012.

(51) Int. Cl.
*H01M 2/20* (2006.01)
*H01M 2/10* (2006.01)
(Continued)

(52) U.S. Cl.
CPC ......... *H01M 2/206* (2013.01); *H01M 2/1077* (2013.01); *H01M 10/0525* (2013.01);
(Continued)

(58) Field of Classification Search
CPC ........ H01M 2/20; H01M 2/202; H01M 2/204; H01M 2/206; H01M 2/1077
See application file for complete search history.

(56) References Cited

U.S. PATENT DOCUMENTS

| 8,163,412 B2 * | 4/2012 | Koetting | H01M 10/425 429/151 |
| 2005/0031946 A1 * | 2/2005 | Kruger | H01M 2/0212 429/159 |

(Continued)

FOREIGN PATENT DOCUMENTS

| KR | 10-2010-0003143 A | 1/2010 |
| KR | 10-2011-0044130 A | 4/2011 |

OTHER PUBLICATIONS

Korean Intellectual Property Office, International Search Report of PCT/US2013/049966, dated Oct. 24, 2013, WIPO, 2 pages.

*Primary Examiner* — Ula C Ruddock
*Assistant Examiner* — Thomas H. Parsons
(74) *Attorney, Agent, or Firm* — McCoy Russell LLP

(57) ABSTRACT

A battery module is provided. The battery module includes a set of stacked battery cells, each stacked battery cell including at least one cell tab and a bus bar assembly including a bus bar, a bus bar support overmolded around a sense line electrically coupled to the battery cells, the bus bar support including cell tab openings having the plurality of cell tabs extending therethrough.

20 Claims, 8 Drawing Sheets

(51) Int. Cl.
*H01M 10/48* (2006.01)
*H01M 10/0525* (2010.01)
*H01M 10/625* (2014.01)
*H01M 10/647* (2014.01)
*H01M 10/6555* (2014.01)
*H01M 10/613* (2014.01)

(52) U.S. Cl.
CPC ......... *H01M 10/48* (2013.01); *H01M 10/482* (2013.01); *H01M 10/613* (2015.04); *H01M 10/625* (2015.04); *H01M 10/647* (2015.04); *H01M 10/6555* (2015.04); *H01M 2220/20* (2013.01)

(56) References Cited

U.S. PATENT DOCUMENTS

| | | | |
|---|---|---|---|
| 2008/0131761 A1* | 6/2008 | Liu | H01M 2/1016 429/99 |
| 2011/0076521 A1 | 3/2011 | Shimizu et al. | |
| 2012/0148876 A1 | 6/2012 | Zeng et al. | |

* cited by examiner

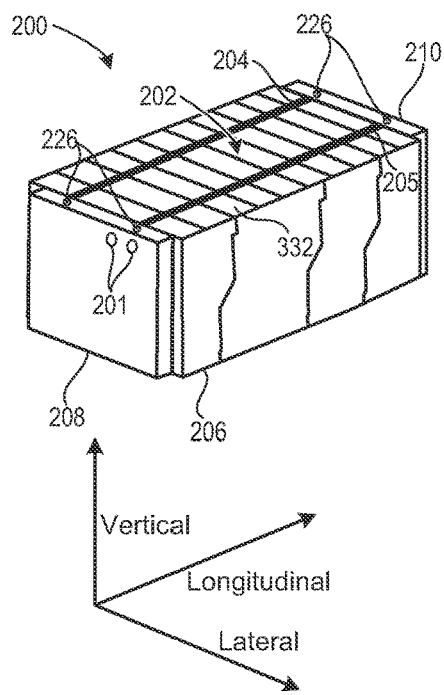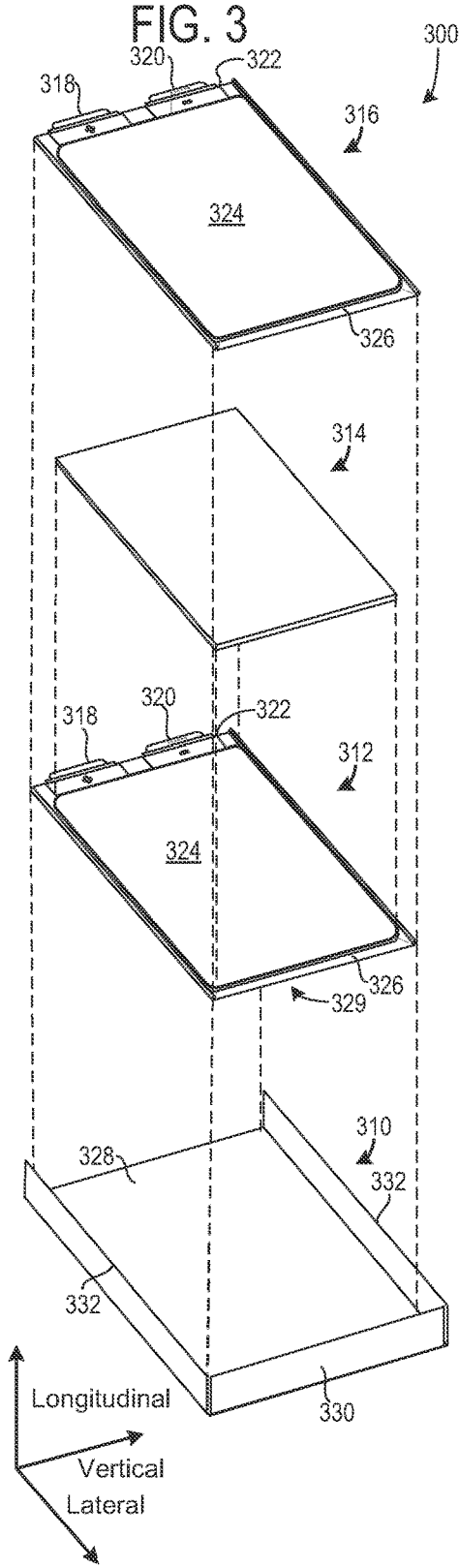

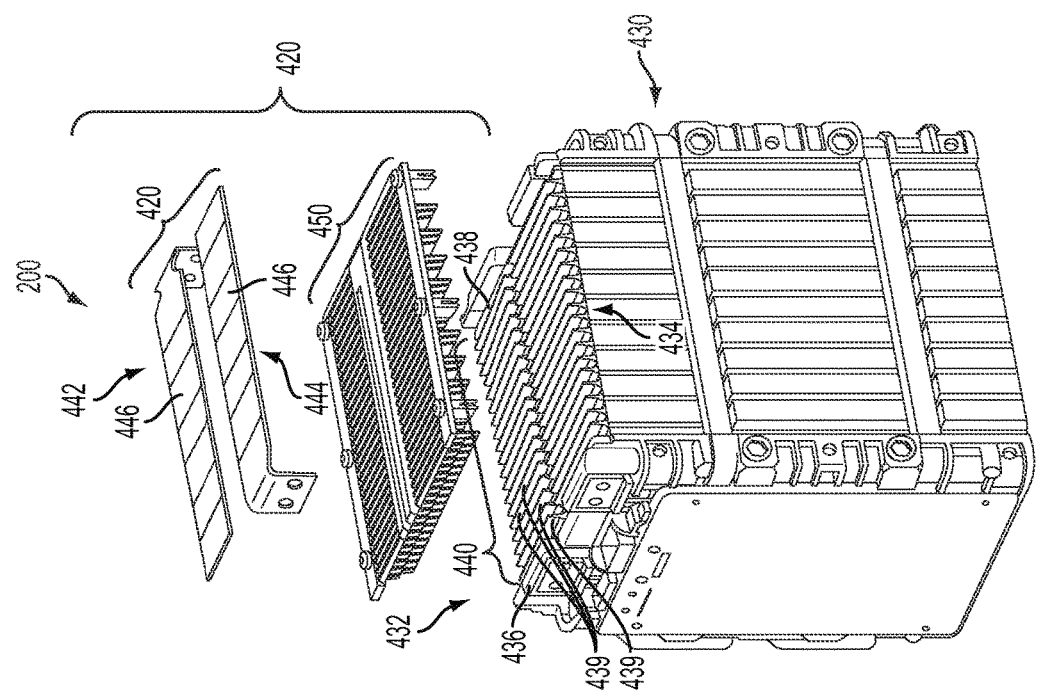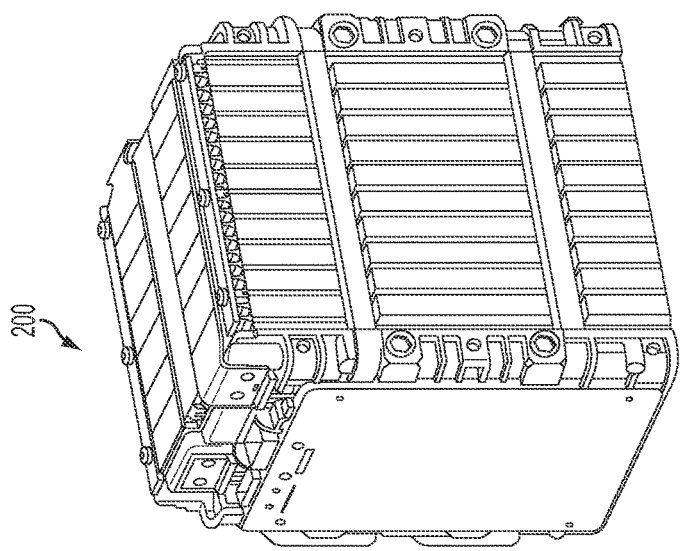
FIG. 4

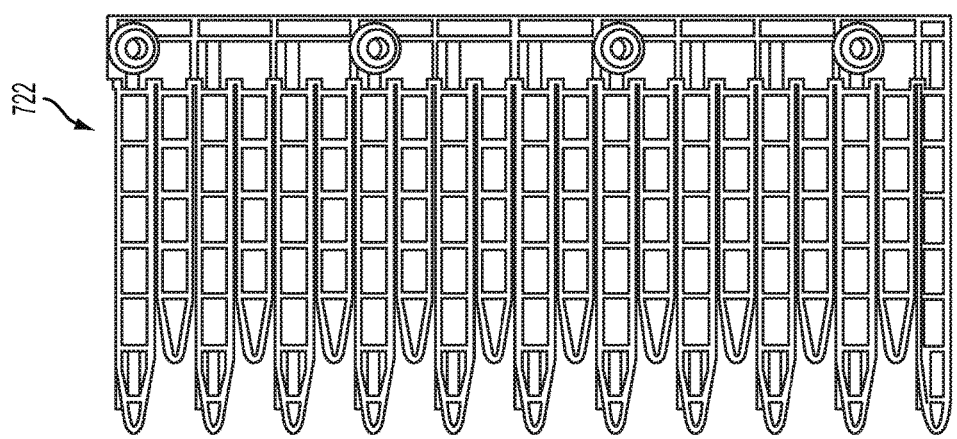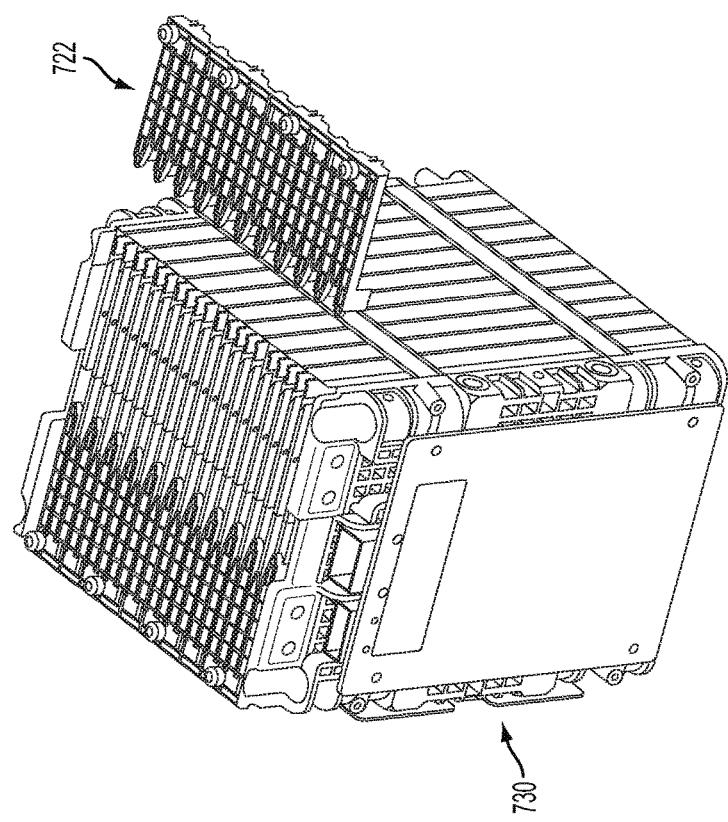
FIG. 8

BUS BAR ASSEMBLY INCLUDING INTEGRATED BUS BAR SUPPORT

CROSS REFERENCE TO RELATED APPLICATIONS

This application is the United States National Phase of International Patent Application Serial No. PCT/US2013/049966, entitled "Bus Bar Assembly Including Integrated Bus Bar Support," filed Jul. 10, 2013, which claims priority to U.S. Provisional Patent Application No. 61/670,017, entitled "Integrated Bus Bar Support Assembly," filed Jul. 10, 2012, the entire contents of each of which are hereby incorporated by reference for all purposes.

TECHNICAL FIELD

The present description relates to charge-discharge management in rechargeable batteries.

BACKGROUND AND SUMMARY

Rechargeable batteries may be used to store and supply electricity in various applications. Examples of rechargeable batteries include lead acid, nickel cadmium (NiCd), nickel metal hydride (NiMH), lithium ion (Li-ion), and lithium ion polymer (Li-ion polymer), among others.

Such batteries may be used in portable devices and vehicle systems, for example. In some examples, rechargeable batteries, e.g., lithium based batteries, may be employed to at least partially propel vehicles. For example, such batteries may be employed in electric vehicles and hybrid electric vehicles.

Currently a bus bar support is installed to the battery module that attaches to one or more cells, and then a bus bar is attached to the support joining multiple cells together. A sense line assembly including a sense line and sense line harness is attached to the bus bar to monitor cell voltage. Finally, retaining clips are added to secure the sense line harness.

In one example approach, a battery module is provided. The battery module includes a set of stacked battery cells, each stacked battery cell including at least one cell tab and a bus bar assembly including a bus bar, a bus bar support overmolded around a sense line is electrically coupled to the battery cells, the bus bar support including cell tab openings having the plurality of cell tabs extending therethrough.

In this way, it is possible to have a more robust cell voltage sensing configuration, while also achieving more robust cell aligning with reduced manufacturing complexity. As a result, the manufacturing costs of the battery module may be reduced. Specifically, a sense harness assembly may be omitted from the battery module, if desired, due to the integration of the sense line into the bus bar support.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the present application, the scope of which is defined uniquely by any claims that may be presented. Furthermore, the present application is not limited to implementations that solve any disadvantages noted above or in any part of this disclosure.

BRIEF DESCRIPTION OF THE DRAWINGS

FIG. 2 shows a schematic view of an example battery module.

FIG. 3 shows an exploded schematic view of an example battery cell stack.

FIGS. 4-8 show example integrated bus bar support assemblies.

DETAILED DESCRIPTION

Figure 1:
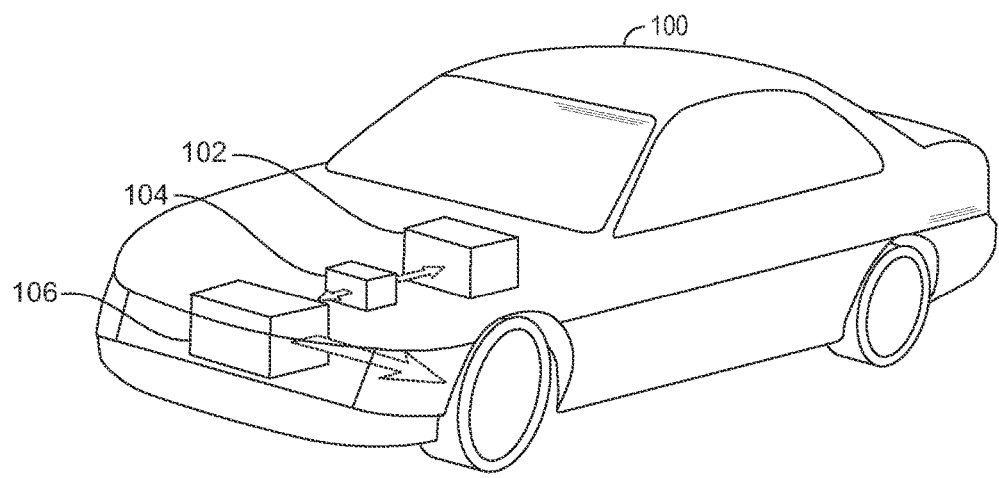
FIG. 1 shows a schematic view of a battery control system in a vehicle.

Turning now to FIG. 1, a schematic view of a non-limiting application of the systems and methods described herein is shown. In particular, a battery pack 102 may be installed in a vehicle 100 for the purpose of supplying energy to propel vehicle 100 by way of electric motor 106. A vehicle controller 104 may facilitate communication between battery pack 102 and motor 106. In one example, vehicle 100 may be propelled solely by electric motor 106. In another example, vehicle 100 may be a hybrid vehicle that may be propelled by an electric motor and an internal combustion engine.

Battery packs used in such applications may be configured in a variety of ways and may include any number of battery cells arranged in a variety of configurations. FIG. 2 shows an example battery module 200 that may be included in a plurality of battery modules. Battery module 200 may include a plurality of stacked battery cells 202 and output terminals 201. The stacked arrangement allows the battery cells to be densely packed in the battery module.

The battery cells 202 may be strapped together by binding bands 204 and 205. The binding bands may be wrapped around the battery cell stack or may simply extend from the front of the battery cell stack to the back of the battery cell stack. In the latter example, the binding bands may be coupled to a battery cover. In other examples, the binding bands may be comprised of threaded studs (e.g., metal threaded studs) that are bolted at the ends. Further, various other approaches may be used to bind the cells together into the stack. For example, threaded rods connected to end plates may be used to provide the desired compression. In another example, the cells may be stacked in a rigid frame with a plate on one end that could slide back and forth against the cells to provide the desired compressive force. In still other examples, rods held in place by cotter pins, or the like, may be used to secure the battery cells in place. Thus, it should be understood that various binding mechanisms may be used to hold the cell stack together, and the application is not limited to metal or plastic bands. Cover 206 provides protection for battery bus bars (See FIG. 4, et. seq.) that route charge from the plurality of battery cells to output terminals of the battery module.

Battery module 200 may also include a front end cover 208 and a rear end cover 210 coupled to the battery cell stack. The front and rear end covers include module openings 226. However, in other examples the module openings may be included in a portion of the battery module containing battery cells.

FIG. 3 shows an exploded view of a portion of an example battery cell unit 300. As shown, the battery cell unit may be built in the order of a housing heat sink 310, battery cell 312, compliant pad 314, battery cell 316, and so on. However, it will be appreciated that other arrangements are possible. For example, the battery cell unit may be built in the order of a housing heat sink, battery cell, housing heat sink, etc. Further in some examples, the housing heat sink may be integrated into the battery cell units.

Battery cell 312 includes a cathode 318 and an anode 320 for connecting to a bus bar (see FIG. 4 et. seq.). The cathode and/or the anode may be coupled to cell tabs extending away from the prismatic cell 324, in one example. Further still in one example, the cathode and the anode may be cell tabs. The bus bar routes charge from one battery cell to another. A battery module may be configured with battery cells that are coupled in series and/or parallel. Bus bars couple like battery cell terminals when the battery cells are combined in parallel. For example, the positive terminal of a first battery cell is coupled to the positive terminal of a second battery cell to combine the battery cells in parallel. Bus bars also couple positive and negative terminal of battery cell terminals when it is desirable to increase the voltage of a battery module.

Battery cell 312 further includes a prismatic cell 324 that contains electrolytic compounds. Prismatic cell 324 is in thermal communication with cell heat sink 326. Cell heat sink 326 may be formed of a metal plate with the edges bent up 90 degrees on one or more sides to form a flanged edge. In the example of FIG. 3, two opposing sides include a flanged edge. However, other geometries are possible. Battery cell 312 is substantially identical to battery cell 316. Therefore similar parts are labeled accordingly. Battery cells 312 and 316 are arranged with their terminals in alignment and exposed.

In some examples, a compliant pad 314 may be interposed between battery cell 312 and battery cell 316. However, in other examples the compliant pad may not be included in the battery cell stack.

Housing heat sink 310 may be formed by a metal plate having a base 328 with the edges bent up 90 degrees on one or more sides to form a flanged edge. In FIG. 3, longitudinally aligned edge 330 and vertically aligned edges 332 are bent flanged edges. As depicted, the housing heat sink is sized to receive one or more battery cells so that one or more battery cells may be positioned within base 328. Thus, the flanged edges of the battery cells may be in contact with housing heat sink 310 and underside 329 of battery cell 312 may be in contact with the base of the housing heat sink, facilitating heat transfer.

One of the longitudinally aligned edges 332 of the housing heat sink 310 may form a portion of the top side of battery module 300, as shown in FIG. 3. Similarly, one of the longitudinally aligned edges 432 may form a portion of the bottom side of the battery module. Thus, the longitudinally aligned edges of the housing heat sink may be in contact with the first and the second cooling subsystems to improve heat transfer. In this way, heat may be transferred from the battery cells to the exterior of the battery module.

Referring now to FIG. 4, an example of the battery module 200 is shown on the left side. An exploded view of the battery module 200 is shown on the rights side. The battery module 200 includes a bus bar assembly 420 (e.g., integrated bus bar assembly) and cell assembly 430. The cell assembly 430 includes a first set of stacked battery cell units 432 and a second set of stacked battery cell units 434. Each of the sets of stacked battery cells may be similar in size, shape, and functionality, in one example. However, in other examples, the size, shape, and/or functionality may vary between the sets of stacked battery cells. The first set of stacked battery cell units 432 includes a first peripheral cell unit 436 and a second peripheral cell unit 438. A plurality of interior cell units 440 positioned between the first peripheral cell unit 436 and the second peripheral cell unit 438. In this way, the plurality of interior cell units are positioned between two peripheral cell units. Each of the battery cell unit in the stack may be similar to the battery cell unit shown in FIG. 3. Each of the cell units included in the first set of stacked battery cell units 432 includes a cell tab 439.

The bus bar assembly 420 includes bus bars. Specifically, the bus bar assembly 420 includes a first bus bar 442 and a second bus bar 444. The first bus bar 442 and the second bus bar 444 include planar surfaces 446. Thus, the bus bars 422 may be referred to as flat bus bars, in one example.

The bus bar assembly 420 further includes a bus bar support 450. The bus bar support 450 is configured to receive the bus bars 422 when the battery module is assembled. As can be seen from the approximately to scale isometric rendering, the integrated bus bar assembly 420 interlocks with the cell units forming the battery module 200.

Figure 5:
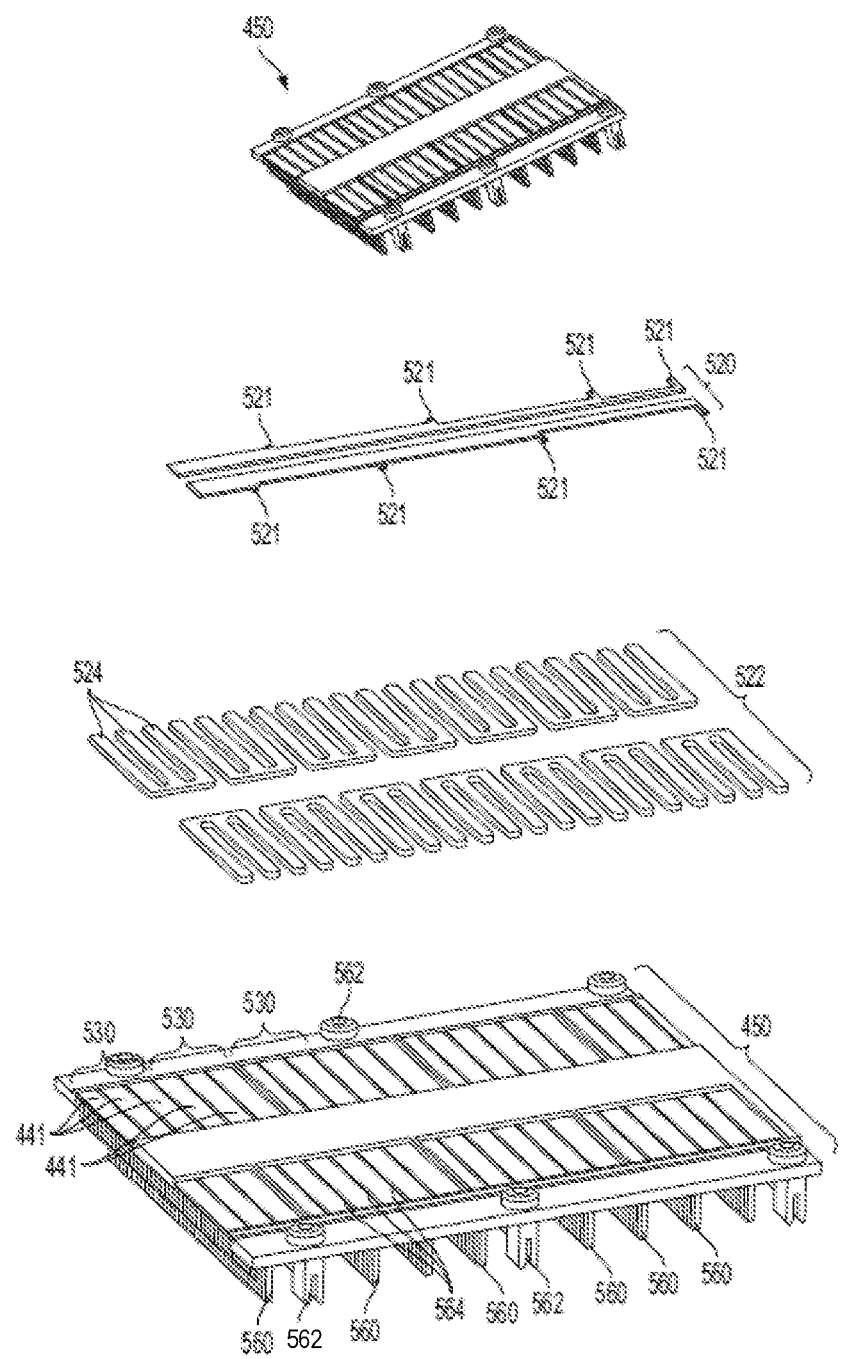

FIG. 5 shows additional details of a portion of the bus bar assembly 420 (e.g., integrated bus bar assembly) shown in FIG. 4. The portion of the bus bar assembly 420 shown in FIG. 5 is drawn approximately to scale and in an assembled view on the left and an exploded view on the right.

Specifically, the bus bar support 450 is shown in FIG. 5. A sense line 520 is also shown. The sense line 520 is formed from a single continuous piece of material, in the depicted example. The sense line 520 may be included in the bus bar assembly 420. Additionally, sense line 520 may be overmolded by the bus bar support 450, when assembled. Thus, the sense line 520 may be enclosed by the bus bar support. In this way, the sense line 520 may be integrated into the bus bar support 450. The sense line 520 may be positioned in a central portion of the bus bar assembly 420. The sense line 520 includes a plurality of terminals 521. The terminals 521 may be electrically coupled to cells in the cell assembly 430, shown in FIG. 4. Specifically, the terminals 521 are coupled (e.g., directly coupled) to a plurality of sub bus bars 522. Moreover, each terminal may be coupled to a different sub bus bar, in one example. Each of the sub bus bars 522 includes three extensions 524. The extensions 524 may include opposing planar surfaces. Additionally, each of the plurality of sub bus bars is spaced away from one another, in the depicted example. However, at least a portion of the sub bus bars may be positioned adjacent to one another, in other examples. The sub bus bars 522 may be positioned in recesses 530 in the bus bar support 450 when assembled. In this way, the sub bus bars 522 may be at least partially enclosed by the bus bar support 450. Additionally, the cell tabs 439 in the cell assembly 430, shown in FIG. 4, may be in face sharing contact with the sub bus bars 522. Furthermore, the plurality of sub bus bars 522 may be in face sharing contact with the bus bar 442 shown in FIG. 4. Further still in one example, each of the sub bus bars 522 is positioned between one of the cell tabs 439 and the bus bar 442. The cell tabs 439 may be bent to form the aforementioned assembly configurations. Thus, the cells tabs 439 may be non-straight. The bending of the cell tables 439 is discussed in greater detail herein with regard to FIG. 9. Furthermore, the sub bus bars 522 may be in face sharing contact with surface 441 of the sub bar support 450 when assembled, in some examples.

Additionally, FIG. 5 shows the bus bar support 450 including a plurality of cell aligning projections 560. Thus, the bus bar support 450 and the cell aligning projections 560 form a continuous piece of material. However, in other examples the cell aligning projections 560 may be separate from the bus bar support 450. The cell aligning projections

560 may extend into the cell assembly 430 shown in FIG. 4 and each projection may be positioned between two cell units. In this way, spacing between the cell units may be maintained. As a result, the structural integrity of the battery module may be increased and the likelihood of short circuiting and/or overheating in the battery module may be reduced.

In either case, the cell aligning projections 560 are included in the bus bar assembly 420. The bus bar support 450 includes attachment apparatuses 562. The attachment apparatuses 562 are configured to attach to the cell assembly 430, shown in FIG. 4.

The bus bar support 450 further includes a plurality of cell tab openings 564. The cell tab openings 564 have cell tabs included in the cell assembly 430 extending therethrough when the bus bar assembly 420 is assembled.

Figure 6:
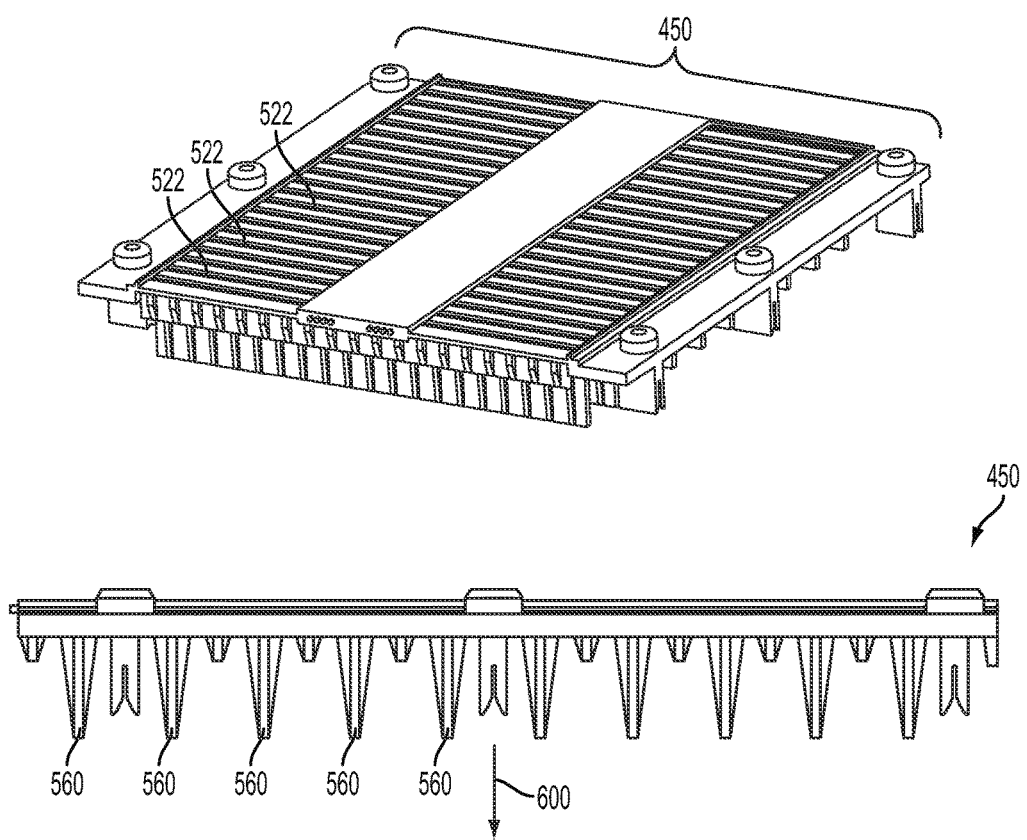

FIG. 6 shows still further details of the bus bar support 450 having the sub bus bars 522 integrated therein. A side view of the bus bar support 450 is also shown in FIG. 6. The cell aligning projections 560 are illustrated as tapering in a direction, indicated via arrow 600, extending into the cell assembly 430 shown in FIG. 4, when the bus bar support 450 and the cell assembly 430 are assembled. Thus, the cell aligning projections 560 project downward with spacing aligned to spacing of the cells so that the projections nest with the cells to align the cells with respect to one another. In one example, the projections have spacing that is the same as, or a multiple of, the cell spacing.

Figure 9:
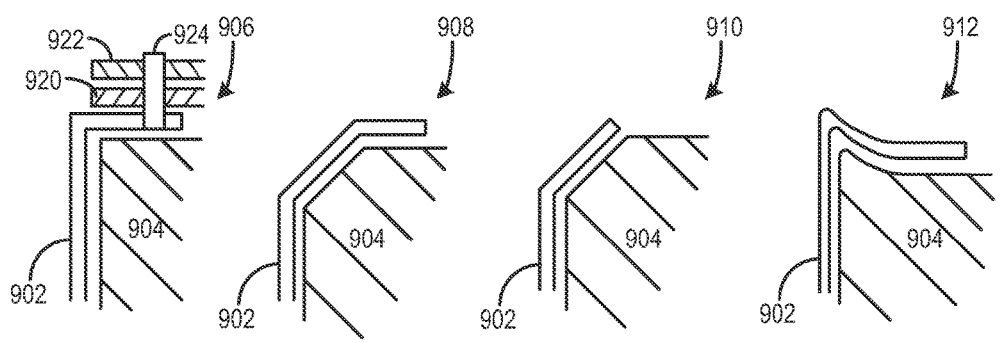
FIG. 9 shows example cell tabs around a bus bar support.

In this way, it is possible to incorporate a bus bar support to structurally couple one or more cells together, integrated with a bus bar to electrically couple the one more or cells (e.g., a plurality of cells) and a sense line to monitor cell voltage. Thus, all of the bus bar supports are combined into a single piece, creating one larger bus bar support. In some examples, the single piece may comprise multiple pieces connected via a harness or other suitable coupling mechanism for larger modules, for example. This bus bar support has over molded in it, sense line terminals to replace the sense line harness, if desired. The sense line terminals attach to a sub bus bar. This complete assembly is placed over the module with the cell tab sticking through. The complete assembly also includes a cell tab spacing feature. For example, as shown in FIG. 9, the cell tabs 902 may be folded in a variety of ways around a bus bar support 904 using different folding methods. For example, as shown at 906, cell tab 902 may be folded from a vertical to horizon position creating an L-shape against the sub bus bars. A sub bus bar 920 and a bus bar 922 are shown in the example at 906. Additionally, a weld 924 couples the sub bus bar 920, the bus bar 922, and the cell tab 902.

As another example, as shown at 908, the cell tab may be folded into a polygonal shape around three interfaces of the bus bar support 904. As still another example, as shown at 910, the cell tab may be folded into a polygonal shape around two interfaces of the bus bar support 904. As yet another example, as shown at 912, the cell tab may be folded into a curved shape around edges of the bus bar support 904. The bus bar may be placed on top of the sub bus bar and the folded tab creating a three-layer sandwich that can be welded together in one example. The bus bar may be any suitable shape. In some examples, the bus bar may be flat whereas in other examples the bus bar may not be flat but may include welded features on a flat portion of the bus bar.

Figure 7:
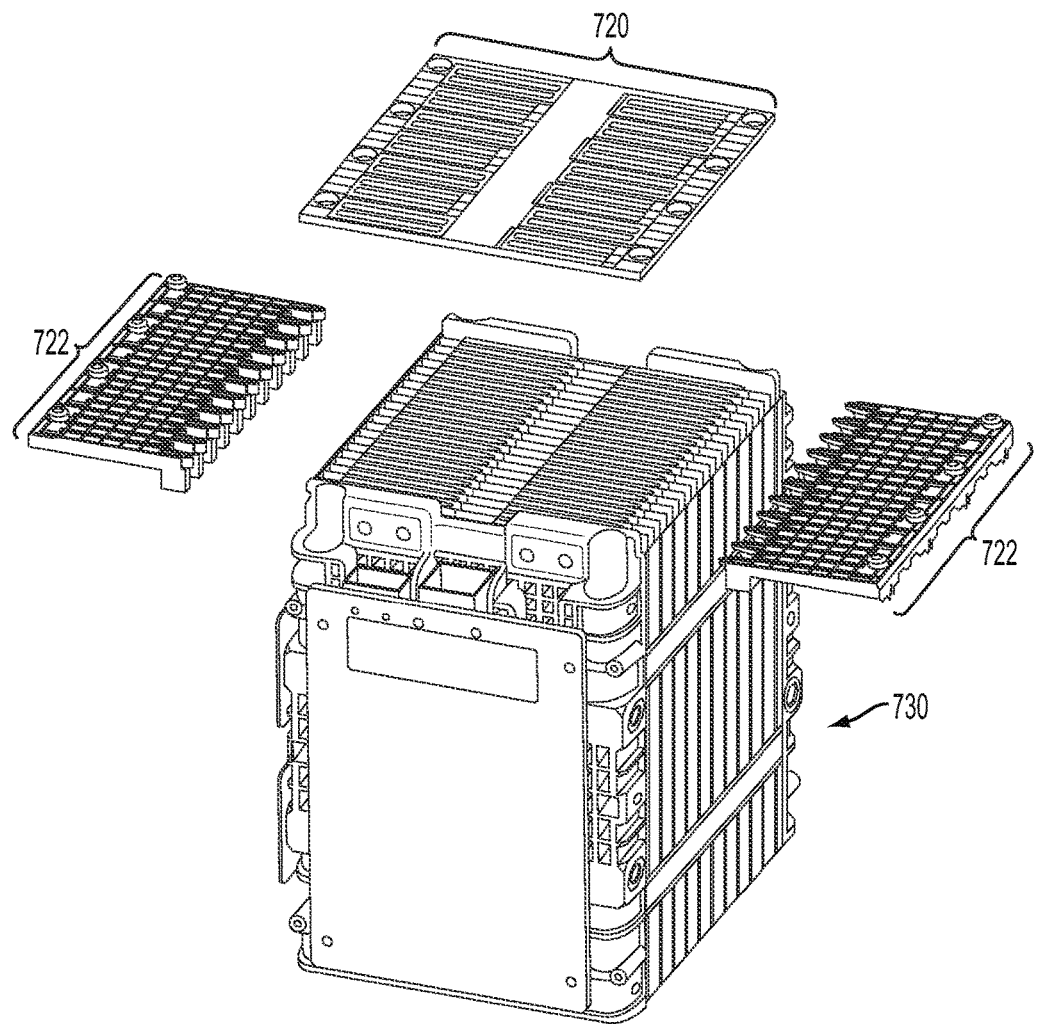

While the example of FIGS. 4-6 shows the bus bar support assembly including cell-aligning projections, these may be omitted in some examples. Specifically, the configuration shown in FIGS. 7-8 show an integrated bus bar support 720 similar to 420, but without cell aligning projections, and instead using a separate cell aligning piece. FIG. 7 shows, approximately to scale, integrated bus bar support 720 as well as two cell tab aligning pieces 722. FIG. 8 shows, approximately to scale, additional views of the piece 722 and the various projections that mate with and align with the cell anodes/cathodes of each of the cells in the stack. The cell tab aligning pieces 722 may include cell aligning projections, such as the projections 560 shown in FIGS. 5 and 6. In this way, the cell aligning projections form a continuous cell aligning structure separate from the bus bar support 720. A cell assembly 730 is also shown in FIGS. 7 and 8. The cell assembly 730 may be similar to the cell assembly 430 shown in FIG. 4.

As illustrated in FIGS. 7-8, this configuration incorporates the cell tab spacing features in an additional, separate, piece that is installed first and then a flat bus bar support assembly is installed above it.

FIGS. 1-9 provide for a battery module comprising a set of stacked battery cell units, each stacked battery cell unit including at least one cell tab and a bus bar assembly including a bus bar, a bus bar support overmolded around a sense line electrically coupled to the battery cell units, the bus bar support including cell tab openings having the plurality of cell tabs extending therethrough.

FIGS. 1-9 further provide for a battery module where the set of stacked battery cells includes a plurality of interior cell units positioned between two peripheral cell units, the bus bar support extending from a first peripheral cell unit to a second peripheral cell units across the plurality of interior cell units. FIGS. 1-9 further provide for a battery module where the sense line forms a single continuous piece of material. FIGS. 1-9 further provide for a battery module where the sense line includes a plurality of terminal, each terminal electrically coupled to at least one battery cell. FIGS. 1-9 further provide for a battery module where the bus bar assembly further includes a plurality of sub bus bars.

FIGS. 1-9 also provide for a battery module where each cell tab is in face sharing contact with one of the plurality of sub bus bars. FIGS. 1-9 further provide for a battery module where the plurality of sub bus bars are in face sharing contact with the bus bar. FIGS. 1-9 further provide for a battery module where each of the sub bus bars is positioned between one of the cell tabs and the bus bar. FIGS. 1-9 further provide for a battery module where the bus bar, the sub bus bars, and the cell tabs are coupled to eachother via welds.

FIGS. 1-9 further provide for a battery module where the sub bus bars are spaced away from one another. FIGS. 1-9 further provide for a battery module where the sub bus bars are in face sharing contact with a surface of the sub bar support. FIGS. 1-9 further provide for a battery module where the sub bus bars are directly coupled to the sense line. FIGS. 1-9 further provide for a battery module where the bus bar assembly further comprises a plurality of cell aligning projections extending into the set of stacked battery cells. FIGS. 1-9 further provide for a battery module where the bus bar support and the cell aligning projections form a single continuous piece of material.

FIGS. 1-9 further provide for a battery module where each cell aligning projection tappers in a direction extending into the plurality of stacked battery cells. FIGS. 1-9 further provide for a battery module where the cell aligning projections form a continuous cell aligning structure separate from the bus bar support.

FIGS. 1-9 provide for a battery module comprising a set of stacked battery cell units, each stacked battery cell unit including at least one cell tab and a bus bar assembly including a bus bar, a bus bar support overmolded around a sense line, and a plurality of sub bus bars coupled to the sense line, each sub bus bar in face sharing contact with one or more of the cell tabs and the bus bar, the bus bar support including cell tab openings having the plurality of cell tabs extending therethrough.

FIGS. 1-9 further provide for a battery module where the sub bus bars are positioned in recesses in the bus bar support. FIGS. 1-9 further provide for a battery module where the cells tabs are non-straight.

FIGS. 1-9 also provide for a battery module comprising a set of stacked prismatic battery cell units, each stacked prismatic battery cell unit including at least one cell tab and a bus bar assembly including a bus bar, a bus bar support overmolded around a sense line, and a plurality of sub bus bars coupled to the sense line, each sub bus bar in face sharing contact with one or more of the cell tabs and the bus bar, the bus bar support including cell tab openings having the plurality of cell tabs extending therethrough and a plurality of cell aligning projections extending into the set of stacked battery cells.

Through the various configurations disclosed herein, it is possible to obtain a high current carrying bus bar capacity, improved bus bar welding, an integrated sense harness, and improved manufacturing. Further, the over molded terminal eliminates the sense harness assembly, if desired. Further still, using only a single integrated bus bar support eliminates multiple bus bar supports, if desired.

In one particular example, the system configuration enables substantially flat bus bars, thus improving assembly, reducing errors, and improving the system's ability to absorb tolerances. Further, the configuration is compatible with current cover designs and enables the bus bar to be integrated with the sense lines. Additionally, the flat shape of the bus bar allows for higher current capacity, while also enabling the cells to be aligned and the cell tabs to include guide features.

The subject matter of the present disclosure includes all novel and nonobvious combinations and subcombinations of the various systems and configurations, and other features, functions, and/or properties disclosed herein.

The invention claimed is:

1. A battery module comprising:
a set of stacked battery cell units, each stacked battery cell unit including tabs;
a flat sense line with a plurality of terminals coupled to the set of stacked battery cell units via the tabs, the terminals progressively extending laterally wider at specific distances along the stacked battery cell units; and
a bus bar assembly including a bus bar, a bus bar support that is positioned between the bus bar and the set of stacked battery cell units, the bus bar support overmolded around the sense line electrically coupled to the battery cell units, the bus bar support including cell tab openings having the tabs extending therethrough, and the bus bar support including a plurality of cell aligning projections extending into the set of stacked battery cell units.

2. The battery module of claim 1, where the set of stacked battery cell units includes a plurality of interior cell units positioned between two peripheral cell units, the bus bar support extending from a first peripheral cell unit to a second peripheral cell unit across the plurality of interior cell units.

3. The battery module of claim 1, where the sense line forms a single continuous piece of material, and wherein the tabs comprise an anode and a cathode of a cell.

4. The battery module of claim 3, where the sense line includes the plurality of terminals.

5. The battery module of claim 1, where the bus bar assembly further includes a plurality of sub bus bars, and wherein the plurality of cell aligning projections and the bus bar support form a continuous piece of material, with each projection positioned between two cell units, taper in a direction of the extending into the bus bar assembly, and project downward with spacing aligned to spacing of the battery cell units so that the projections nest with the battery cell units to align the battery cell units with respect to one another.

6. The battery module of claim 5, where each tab is in face sharing contact with one of the plurality of sub bus bars.

7. The battery module of claim 5, where the plurality of sub bus bars is in face sharing contact with the bus bar.

8. The battery module of claim 5, where each of the plurality of sub bus bars is positioned between one of the tabs and the bus bar.

9. The battery module of claim 5, where a portion of the tabs is positioned between the plurality of sub bus bars and the bus bar support.

10. The battery module of claim 5, where the plurality of sub bus bars is in face sharing contact with a surface of the bus bar support.

11. The battery module of claim 5, where the plurality of sub bus bars is directly coupled to the sense line.

12. The battery module of claim 1, where the tabs are folded around the bus bar support.

13. The battery module of claim 1, where the plurality of cell aligning projections has a spacing that is a multiple of a spacing of the set of stacked battery cell units.

14. The battery module of claim 1, further comprising attachment apparatuses that extend into the set of stacked battery cell units, wherein the attachment apparatuses are configured to attach to the set of stacked battery cell units.

15. The battery module of claim 14, where the plurality of cell aligning projections is a different length than the attachment apparatuses, wherein the attachment apparatuses and the plurality of cell aligning projections both extend from the bus bar support into the set of stacked battery cell units, and wherein the attachment apparatuses flank the sense line and are offset from the plurality of cell aligning projections.

16. The battery module of claim 1, where each cell aligning projection tapers in a direction extending into the plurality of stacked battery cell units.

17. A battery module comprising:
a set of stacked battery cell units, each stacked battery cell unit including cell tabs; and
a bus bar assembly including a bus bar, a bus bar support positioned between the bus bar assembly and the set of stacked battery cell units, the bus bar support overmolded around a sense line with a plurality of terminals coupled to the set of stacked battery cell units via the cell tabs, the terminals progressively extending laterally wider at specific distances along the stacked battery cell units, and a plurality of sub bus bars coupled to the sense line, each sub bus bar in face sharing contact with one or more of the cell tabs and the bus bar, the bus bar support including cell tab openings having the cell tabs extending therethrough, and the bus bar support including a plurality of projections extending into the set of stacked battery cell units, wherein the sense line is enclosed by the bus bar support.

18. The battery module of claim 17, where the plurality of sub bus bars is positioned in recesses in the bus bar support.

19. The battery module of claim 17, where the cell tabs are non-straight.

20. A battery module comprising:
a set of stacked prismatic battery cell units, each stacked prismatic battery cell unit including cell tabs; and
a bus bar assembly including a bus bar, a bus bar support that is positioned between the bus bar and the set of stacked prismatic battery cell units, the bus bar support overmolded around a sense line with a plurality of terminals coupled to the set of stacked prismatic battery cell units via the cell tabs, the terminals progressively extending laterally wider at specific distances along the stacked prismatic battery cell units, and a plurality of sub bus bars coupled to the sense line, each sub bus bar in face sharing contact with one or more of the cell tabs and the bus bar, the bus bar support including cell tab openings having the cell tabs extending therethrough and a plurality of cell aligning projections extending from the bus bar support into the set of stacked prismatic battery cell units.

* * * * *